UNITED STATES PATENT OFFICE.

ANNIE GETCHELL, OF BOSTON, MASSACHUSETTS.

HARDENING COPPER.

SPECIFICATION forming part of Letters Patent No. 247,494, dated September 27, 1881.

Application filed December 20, 1880. (No specimens.)

*To all whom it may concern:*

Be it known that I, ANNIE GETCHELL, residing at Boston, in the county of Suffolk and State of Massachusetts, have invented a new and useful Improvement in Hardening Copper; and I do hereby declare that the following is a full, clear, and exact description of the invention, which will enable others skilled in the art to which it appertains to make and use the same.

In carrying out my invention I make use of a composition consisting of the following ingredients, combined in, or about in, the proportions stated, viz: potash, (or soda,) one and one-half pound; alum, one pound; bone-dust, (or other phosphate,) one fourth of a pound; zinc, (or tin,) one-fourth of a pound. A composition made of the ingredients, in the proportions, and of the weight named is suitable for twenty-five pounds, or thereabout, of copper. I first bring the copper to a red heat in a crucible or furnace, and then add the above-named composition. As soon as the whole is melted the slag is removed, and then the charge is ready to pour, it being advisable to have the metal covered with charcoal after the slag has been removed, and while pouring, to prevent oxidation. The metal may be run directly into molds, and will be very hard. It will also have these qualities, viz., density, toughness, and lubricity; hence it will be particularly useful for boxes and other bearings in machinery, and also wherever copper casting may be employed.

I claim as my invention—

The process of hardening copper which consists in mixing with the copper, while it is in or near a molten state, potash, (or soda,) alum, bone-dust, (or other phosphate,) and zinc, (or tin,) substantially as hereinbefore set forth.

ANNIE GETCHELL.

Witnesses:
EDW. DUMMER,
WM. A. HAMMETT.